(12) United States Patent
Johnson et al.

(10) Patent No.: US 10,196,003 B2
(45) Date of Patent: Feb. 5, 2019

(54) HITCH MOUNTED MINI WORK BASKET FOR DEPLOYING AND RETRIEVING HIGHWAY PANELS

(71) Applicant: J-Tech, Inc., Chester Springs, PA (US)

(72) Inventors: Richard S. Johnson, Pottstown, PA (US); Collin E. Johnson, Pottstown, PA (US); Jason M. Rohrer, Reading, PA (US)

(73) Assignee: J-Tech, Inc., Chester Springs, PA (US)

( * ) Notice: Subject to any disclaimer, the term of this patent is extended or adjusted under 35 U.S.C. 154(b) by 72 days.

(21) Appl. No.: 15/353,440

(22) Filed: Nov. 16, 2016

(65) Prior Publication Data

US 2017/0136956 A1    May 18, 2017

Related U.S. Application Data

(60) Provisional application No. 62/256,196, filed on Nov. 17, 2015.

(51) Int. Cl.
*B60R 9/06* (2006.01)
*E01F 9/70* (2016.01)

(52) U.S. Cl.
CPC . *B60R 9/06* (2013.01); *E01F 9/70* (2016.02)

(58) Field of Classification Search
CPC ..................................... B60R 9/06; E01F 9/70
USPC ................................ 224/502, 512, 513, 519
See application file for complete search history.

(56) References Cited

U.S. PATENT DOCUMENTS

| | | | | |
|---|---|---|---|---|
| 3,528,578 A | * | 9/1970 | Schoenberger | B60R 9/06 224/492 |
| 3,650,443 A | * | 3/1972 | Haskett | B60R 9/06 224/513 |
| 3,724,694 A | * | 4/1973 | Wilson | B60R 9/06 224/520 |
| 4,241,858 A | * | 12/1980 | Lawroski | B60R 9/06 224/401 |
| 4,593,840 A | * | 6/1986 | Chown | B60R 9/06 224/484 |
| 4,646,952 A | * | 3/1987 | Timmers | B60R 9/06 224/485 |
| 4,744,590 A | * | 5/1988 | Chesney | B60R 9/06 224/520 |
| 5,213,464 A | | 5/1993 | Nicholson et al. | |
| 5,310,100 A | * | 5/1994 | Liscinsky | B60R 9/065 108/44 |

(Continued)

*Primary Examiner* — Peter N Helvey
(74) *Attorney, Agent, or Firm* — Miller Law Group, PLLC

(57) ABSTRACT

A work basket includes a frame having a work platform mounted thereon to permit people to move about the work basket to position supplies on a highway surface from the vehicle on which the work basket is mounted. The work basket has an adjustable hitch mechanism to permit vertical positioning of the hitch for engagement with the hitch receiver on the support vehicle. A pair of outrigger arms mounted on the frame of the work basket on opposing sides of the hitch member is horizontally and vertically adjustable to position a foot member on the distal end of the outrigger arm into engagement with flat surfaces on opposing sides of the support vehicle to stabilize the work basket. Vertical adjustment of the outrigger arm is accomplished by manipulation of an adjustment screw positioned at the support bracket and by the vertical positioning of the outrigger within the frame member.

19 Claims, 8 Drawing Sheets

(56) References Cited

U.S. PATENT DOCUMENTS

| | | | | |
|---|---|---|---|---|
| 6,024,263 A * | 2/2000 | Lewis, Sr. | B60R 9/06 224/502 |
| 6,056,498 A | 5/2000 | Velinsky et al. | |
| 6,145,619 A * | 11/2000 | Risser | B66F 11/044 182/113 |
| 6,378,748 B1 * | 4/2002 | Cox | B60R 9/06 224/401 |
| 6,502,730 B2 * | 1/2003 | Johnson | B60R 9/06 224/402 |
| 6,712,248 B2 * | 3/2004 | Mitchell | B60R 9/06 224/498 |
| 6,802,441 B1 * | 10/2004 | DuRant | B60R 9/065 224/513 |
| 6,834,902 B2 * | 12/2004 | Agan | B60P 3/40 224/405 |
| 7,306,398 B2 | 12/2007 | Doran, Jr. | |
| 7,641,235 B1 * | 1/2010 | Anduss | B60R 9/06 224/509 |
| 8,061,572 B2 * | 11/2011 | Myrex | B60R 9/065 224/502 |
| 8,505,684 B1 * | 8/2013 | Bogue | B66F 11/042 182/19 |
| 9,089,728 B2 * | 7/2015 | Halley | A62C 27/00 |
| 9,216,698 B2 * | 12/2015 | Rhodes | B60R 9/065 |
| 9,586,637 B2 * | 3/2017 | Kentner | B62D 63/08 |
| 2005/0092800 A1 * | 5/2005 | Wilson | B60R 9/06 224/513 |
| 2006/0151556 A1 * | 7/2006 | Eby | B60R 9/06 224/519 |
| 2010/0224663 A1 * | 9/2010 | Butler, III | B60R 9/06 224/498 |
| 2015/0110594 A1 * | 4/2015 | Descoteaux | B60P 3/14 414/800 |
| 2015/0283951 A1 * | 10/2015 | Singleton | B60J 7/106 224/519 |

\* cited by examiner

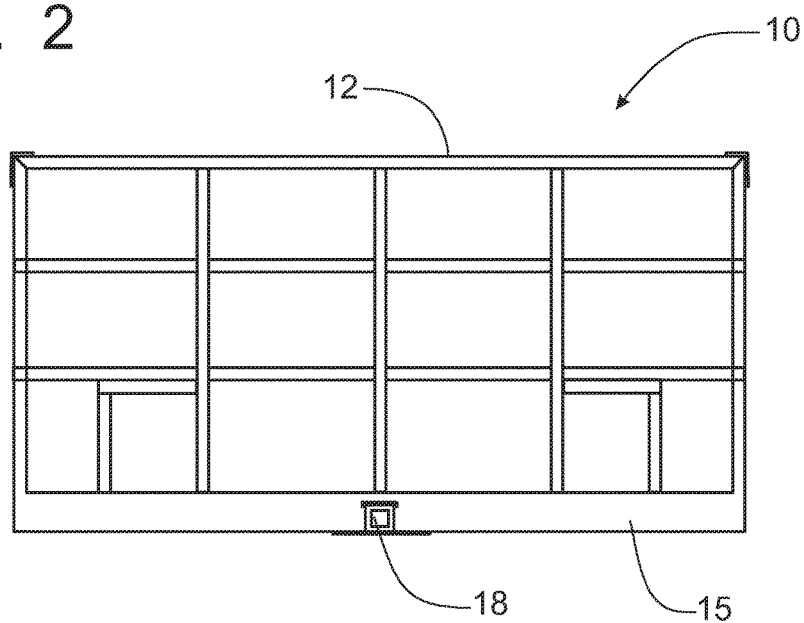
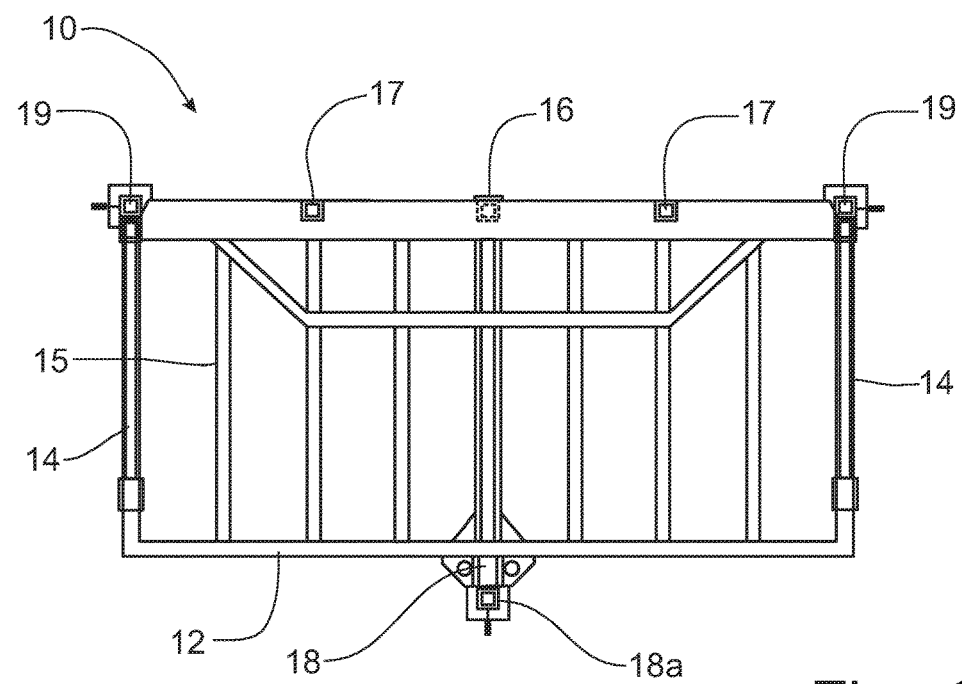

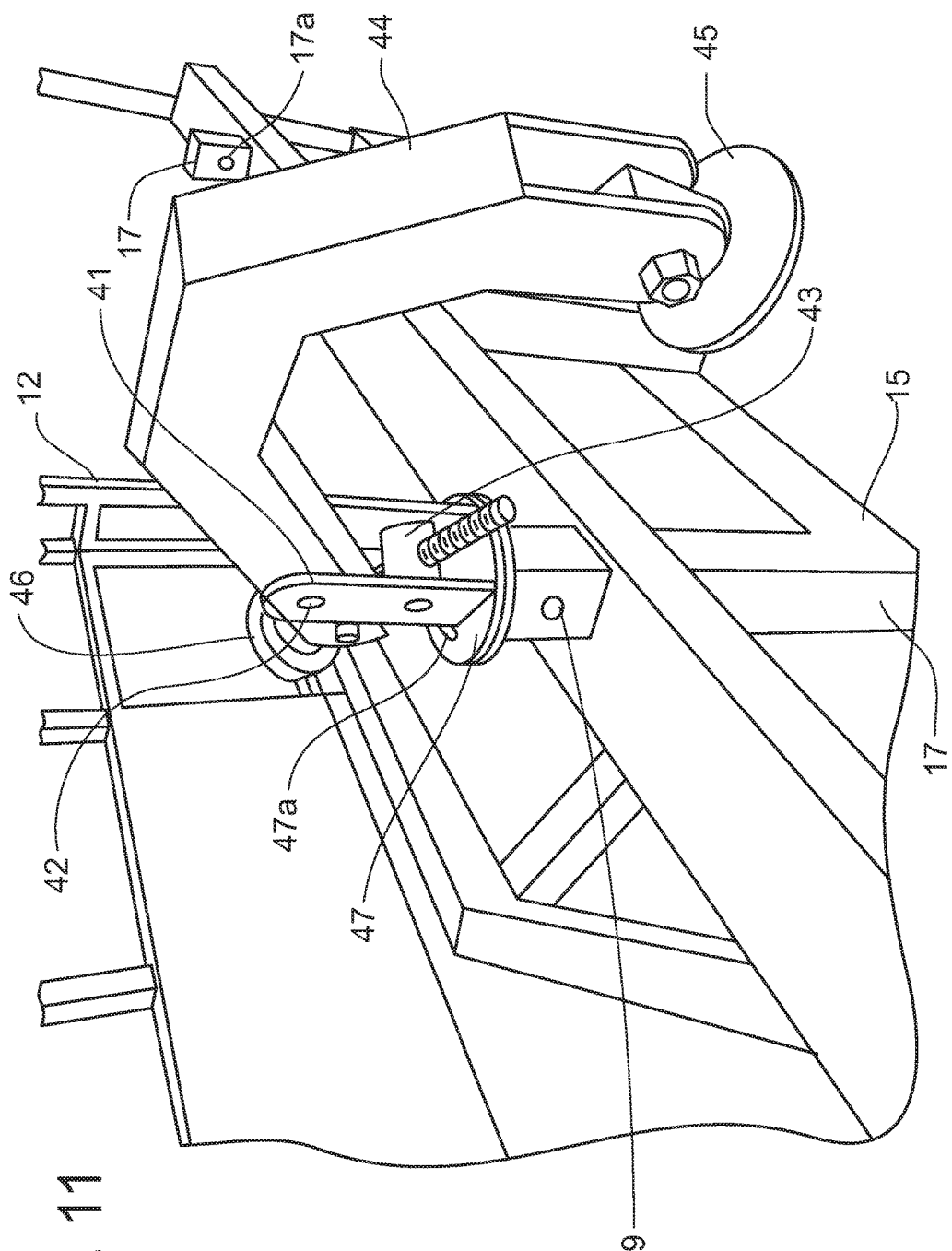

HITCH MOUNTED MINI WORK BASKET FOR DEPLOYING AND RETRIEVING HIGHWAY PANELS

CROSS-REFERENCE TO RELATED APPLICATIONS

This application claims domestic priority on U.S. Provisional Patent Application Ser. No. 62/256,196, filed on Nov. 17, 2015, the content of which is incorporated herein by reference.

FIELD OF THE INVENTION

This invention relates generally to a work basket mounted on the rear of a highway truck to facilitate the placement and retrieval of traffic cones or other traffic control devices on highways for lane closures and, more particularly, to a mounting apparatus that permits the mounting of the work basket at various heights based on road conditions and other related factors.

BACKGROUND OF THE INVENTION

The closure of lanes of traffic on highways for the purposes of highway maintenance and construction is initiated by the placement of traffic cones on the highway to provide an indication to the oncoming traffic that the lane is being closed to traffic. The placement of highway markers in some locations of the country is accomplished by the placement of highway panels or plastic barrels. In other areas of the country, lane closure is initiated by the placement of traffic cones.

Whether deploying highway panels or highway cones, the devices to be deployed and later retrieved are positioned by workers that are positioned near or on the road surface to receive the devices carried on the bed of a highway truck transporting the devices for deployment. A work basket can be connected to the rear of the highway truck to position a worker near the road surface for deployment of the highway panels or cones. With a worker supported along the side of the work basket, highway panels or cones can be positioned on the surface of the highway after another worker provides the device from the bed of the highway truck. Because of the stability that is required of a work basket to carry a worker positioned along an extreme lateral side thereof, work baskets are mounted on substantial frame members of the highway truck, while directional signs giving directions to travelers are usually hauled behind other highway trucks.

Mechanisms have been developed for the placement and retrieval of cone markers, as can be seen in U.S. Pat. No. 5,213,464, granted on May 25, 1993, to John Nicholson, et al, in which a rotating wheel mechanism engages the cone markers guided into the wheel mechanism by a guide member, engages the base of cone marker to invert the cone for engagement with stripper bars that remove the inverted cone marker from the elevating wheel mechanism for placement of the cone marker where the cone marker can be grasped and placed onto the truck bed. The Nicholson wheel mechanism can also be utilized to deploy the cone markers by a worker dropping the cone markers in a specified orientation into a guide device into engagement with the wheel mechanism that orients the cone markers into an upright orientation on the surface of the highway.

U.S. Pat. No. 6,056,498, granted to Steven Velinsky, et al, on May 2, 2000, provides substantially the same function as the Nicholson mechanism through the engagement of the cone marker by a guide mechanism to bring the cone marker into engagement with a lift arm that grasps the cone marker an pivotally elevates the cone marker to the level of the truck bed where the cone marker is stored manually. U.S. Pat. No. 7,306,398, issued to John Doran, Jr. on Dec. 11, 2007, discloses a more complicated arrangement for transferring cone markers from a truck onto the road surface through utilization of a placement arm.

It would be desirable to provide a smaller, lighter work basket that can be manufactured economically, while providing the ability to mount the work basket relative to the highway truck at a position that would enable the work basket to be utilized at the proper height as determined by road conditions. It would also be advantageous to have such a smaller, lighter work basket be able to attach a directional sign thereto.

SUMMARY OF THE INVENTION

It is an object of this invention that to overcome the disadvantages of the prior art by providing a work basket that can be mounted on the trailer hitch of a vehicle carrying supplies to be positioned along a highway surface.

It is another object of this invention to provide a stabilization mechanism carried by the work basket to engage the vehicle carrying the work basket for the purpose of positionally stabilizing the work basket.

It is an advantage of this invention that the provision of a stabilization mechanism on the hitch mounted work basket will maintain the work basket in a stable orientation while workers move about the work basket.

It is a feature of this invention that the stabilization mechanism can have a stabilizing member on opposing sides of the hitch mount to engage corresponding opposite sides of the vehicle on which the work basket is mounted.

It is still another object of this invention to provide a hitch mount that can be adjusted vertically to position the work basket at a desired height irrespective of the height of the hitch receiver mounted on the vehicle to support the work basket.

It is another feature of this invention that the hitch mount includes a support bracket secured to the frame of the work basket and an adjustable hitch member selectively engagable with the support bracket to position the hitch member at a selected height relative to the frame of the work basket.

It is still another feature of this invention that the hitch member is formed with a plurality of vertically spaced fastener openings to permit selective alignment with fastener openings in the support bracket for adjustably positioning the hitch member.

It is another advantage of this invention that the selected position of the hitch member on the support bracket will allow the hitch member to be placed into the vehicle hitch receiver and locate the work basket at the desired height relative to the surface of the highway.

It is yet another feature of this invention that each stabilization member is formed as an outrigger that has a foot member at the end of an outrigger arm to engage a flat surface on the vehicle supporting the hitch mounted work basket.

It is still another feature of this invention that the outrigger arm is pivotally mounted on a connection bracket secured to the work basket and engaged by an adjustment screw that is operable to press the foot member onto the flat surface of the vehicle supporting the hitch mounted work basket.

It is a further feature of this invention that the connection bracket pivotally mounting the outrigger arm is positionable horizontally to permit the foot member to be located for engagement with a suitable flat surface on the vehicle supporting the hitch mounted work basket.

It is a further object of this invention to provide a stable hitch mounted work basket, which is durable in construction, inexpensive of manufacture, carefree of maintenance, facile in assemblage, and simple and effective in use.

These and other objects, features and advantages are accomplished according to the instant invention by providing a work basket that includes a frame having a work platform mounted thereon to permit people to move about the work basket to position supplies on a highway surface from the vehicle on which the work basket is mounted. The work basket has an adjustable hitch mechanism that allows the vertical positioning of the hitch for engagement with the hitch receiver on the support vehicle. A pair of outrigger arms mounted on the frame of the work basket on opposing sides of the hitch member is horizontally and vertically adjustable to position a foot member on the distal end of the outrigger arm into engagement with a flat surface on the opposing sides of the support vehicle to stabilize the work basket. Vertical adjustment of the outrigger arm is accomplished by manipulation of an adjustment screw positioned at the support bracket.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a rear elevational view of the frame for the work basket shown in FIG. 1;

FIG. 3 is a top plan view of the frame for the work basket shown in FIG. 1 with optional jack stands added for an elevated support of the work basket during storage;

FIG. 11 is a right side perspective view of the outrigger shown in FIG. 10, the opposing outrigger being removed from the frame of the work basket for purposes of clarity.

DETAILED DESCRIPTION OF THE PREFERRED EMBODIMENTS

Figure 1:
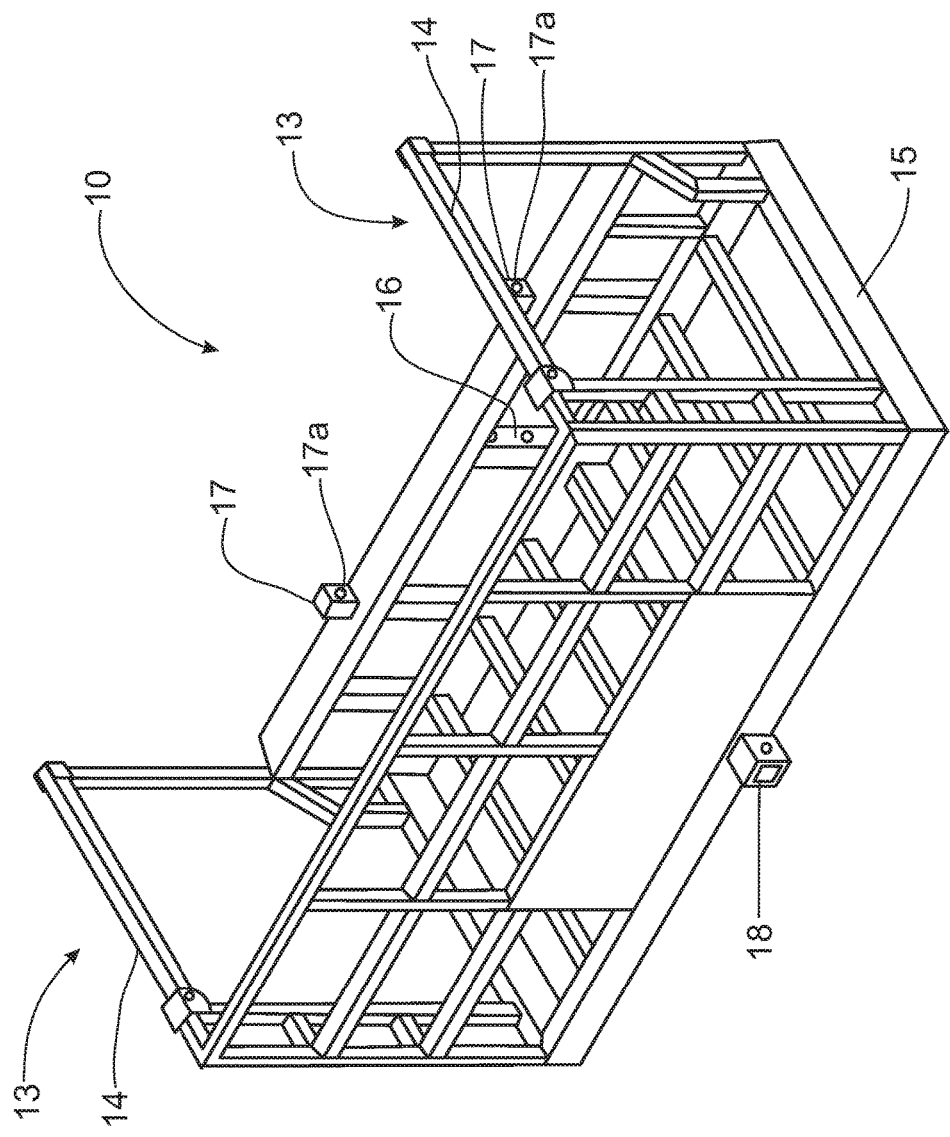
FIG. 1 is a right, rear perspective view of a frame for a mini work basket incorporating the principles of the instant invention, the mounting mechanism is not shown for purposes of showing the structure of the work basket frame.

Referring now to drawings, a work basket mountable to the hitch receiver of a host truck to facilitate the placement of highway cones or panels on a highway to identify construction zones and incorporating the principles of the instant invention can best be seen. References are made to left and right, as well as front and rear can be determined from reference to the truck on which the work basket is mounted standing at the rear of the truck facing the front of the truck in the normal forward direction of travel of the vehicle. One skilled in the art will understand that a decking material (not shown) would be applied to the floor frame members, and to the ledge, as depicted in the drawings. Typically, this decking material would preferably be pooched metal sheeting, which is not shown in the drawings for the purposes of clarity.

As best seen in FIGS. 1-4, a truck is typically used to carry a supply of highway cones or highway panels (not shown) between a remote storage facility and the highway onto which the highway cones or panels are to be placed to indicate a lane closure on the highway. The truck typically includes a frame (not shown) on which is mounted a truck bed and a rearward end that carries a conventional hitch receiver, as is known in the art. The work basket 10 is mounted in the hitch receiver on the truck at the rearward end thereof to provide a work station from which workers can manipulate the highway cones or panels between the truck and the surface of the highway. The work basket 10 is formed as a platform floor (removed for the purpose of clarity) with a fence railing 12 around the perimeter thereof.

Figure 7:
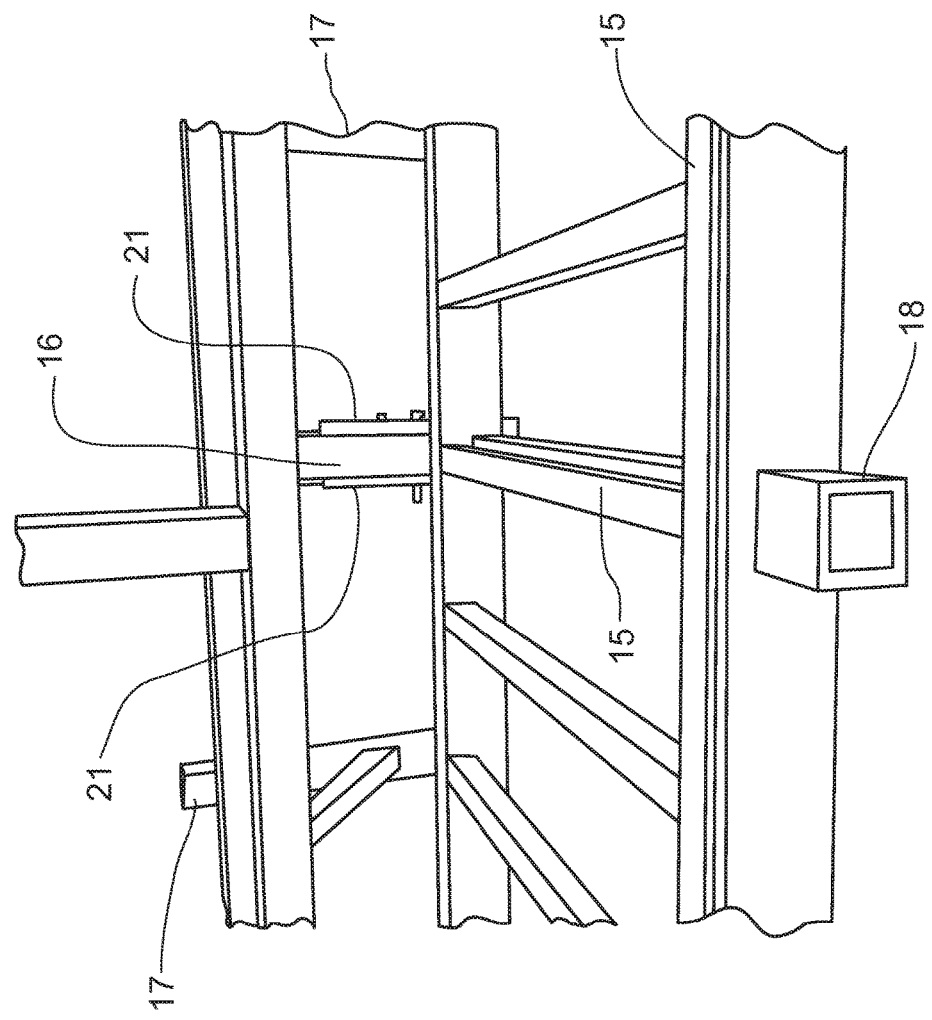
FIG. 7 is a partial enlarged rear perspective view of the central portion of the work basket frame shown in FIG. 5 to depict the hitch receiver built into the frame of the work basket.
Figure 8:
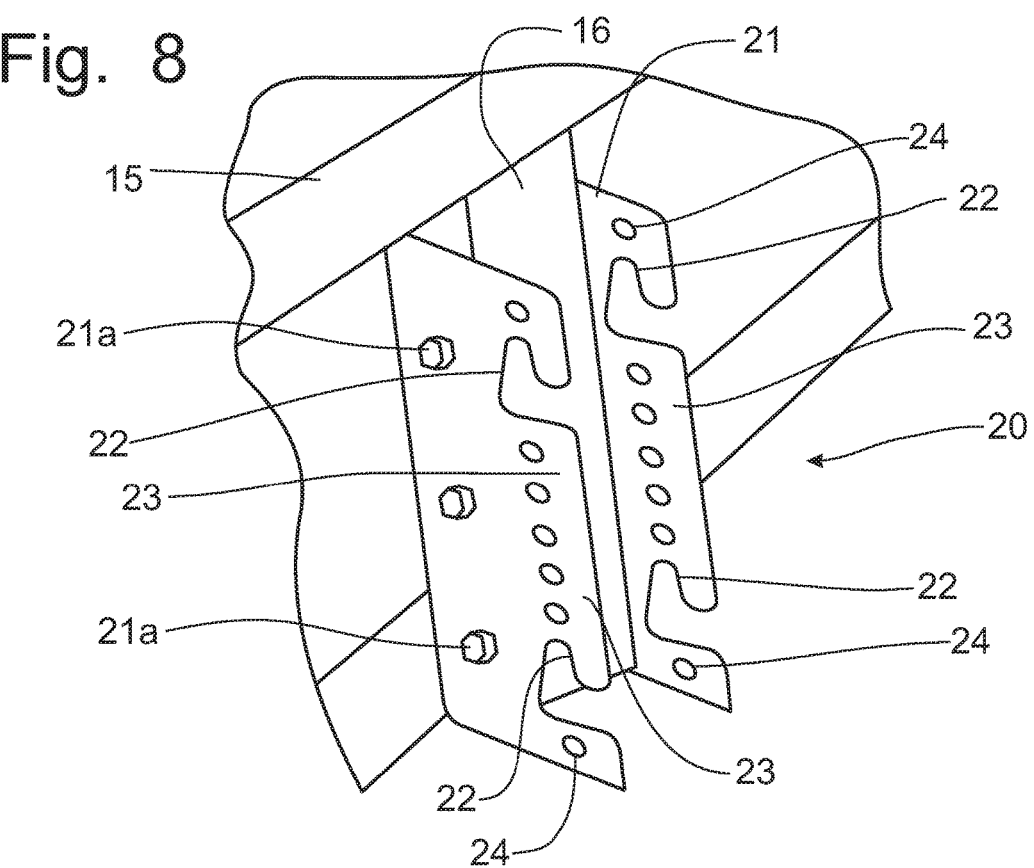
FIG. 8 is a partial enlarged front perspective view of the support bracket for the adjustable hitch mechanism.
Figure 9:
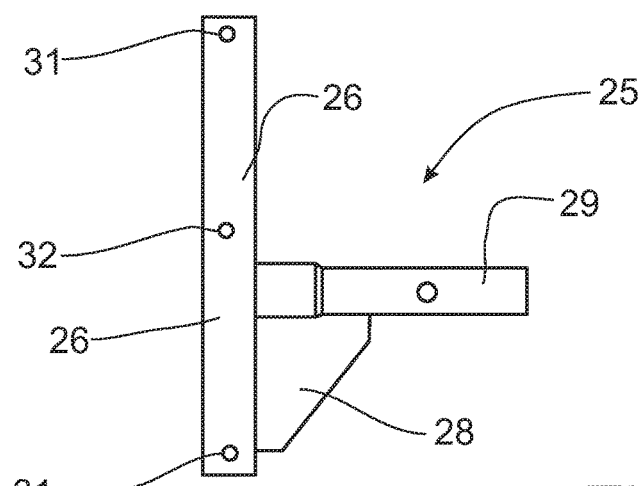
FIG. 9 is a side elevational view of the hitch member of the adjustable hitch mechanism to be connected to the support bracket in a selected position.

The fence railing 12 has two openings 13 therein on the opposing lateral sides of the work basket 10 through which workers can access the surface of the highway. Each opening 13 is closed by a safety gate 14 whether or not the opening is being utilized to deploy traffic cones to the highway. The work basket 10 is formed with a frame 15 that supports the platform floor, and the mounting mechanism 20 as is described in greater detail below. The frame 15 includes a central vertical mounting post 16 on which the mounting mechanism 20 is supported. The forward portion of the frame 15 is lower than the fence railing 12 around the periphery to facilitate the movement of highway cones and panels from the adjacent truck bed. The work basket 10 is equipped with an operable hitch receiver 18 that is affixed to the frame 15 underneath the platform floor. The frame 15, as can best be seen in FIGS. 1, 3 and 7, is reinforced along the central portion thereof to accommodate the towing forces associated with the use of the hitch receiver 18 to pull a trailer bearing an arrow board directional sign (not shown).

Referring now to FIGS. 5-9, the details of the hitch mounting mechanism 20 for mounting the work basket 10 to the hitch receiver of the host truck (not shown) can best be seen. The mounting mechanism 20 includes a pair of support brackets 21 that are affixed, preferably by bolting, to the central vertical mounting post 16 on opposing sides thereof. Each support bracket 21 is formed with a pair of vertically spaced hook members 22 with s central web portion 23 between the hook members 22. Each support bracket 21 is formed with a fastener opening 24 at both the top and bottom thereof to receive a fastener bolt 33 to secure the hitch member 25 to the support brackets 21 as is described in greater detail below. The support brackets 21 are affixed to the central vertical mounting post 16 by fasteners 21a passing through holes formed horizontally through the central vertical mounting post 16 and mating holes through the support brackets 21.

The second component of the mounting mechanism 20 is the adjustable hitch member 25 which is formed with a vertical post 26 that is sized to fit between the support brackets 21 and a forward hitch member 29. The hitch member 29 is shaped and sized to fit internally of the conventional hitch receiver (not shown) on the rear of the host truck (not shown). The vertical post 26 is formed with a pair of fastener openings 31 at the top and bottom thereof, as well as a number of additional openings through the central web portion 23, to receive a fastener 33 to secure the vertical post 26 to the support brackets 21. The vertical post 26 also carries a mounting pin 32 projecting from the opposing sides of the vertical post 26 to engage the appropriate hook members 22 during the mounting of the adjustable hitch member 25 to the support brackets 21.

To mount the work basket 10 to the hitch receiver (not shown) of the host truck (not shown), the adjustable hitch member 25 is mounted to the support brackets 21 in a position that places the work basket 10 at an appropriate orientation relative to the highway and relative to the host vehicle so that the hitch member 25 can engage the hitch receiver (not shown) on the host vehicle. The pins 32 are engaged into the selected corresponding pairs of hook members 21 on the opposing support brackets 21 and then a fastener 33 is passed through aligned holes between the support brackets 21 and the vertical post 26. The work basket 10 can then be manually lifted to engage the hitch member 25 into the hitch receiver on the host vehicle, or more preferably, the work basket 10 is supported on the jack stands 18a, 19, as described below, to permit an easy engagement between the hitch member 25 and the vehicle hitch receiver.

The hook members 22 are selected in the same manner as the location of the first work bolt 33a to position the work basket 10 at the proper position relative to the surface of the highway. Once the selected hook members 22 are placed on the first mounting bolt 33a, the work basket 10 can be tipped upwardly to align the fastener openings 24 in one of the corresponding pairs of tabs 23 with a corresponding fastener opening 31 in the mounting flanges 26 so that a second mounting bolt 33b can be inserted to secure the adjustable hitch member 25 to the support brackets 21. With the plurality of fastener openings 31 available for positioning the first mounting bolt 33a for engagement with a selected pair of hook members 22, the adjustable hitch member 25 can be mounted to the support brackets 21 is a plurality of locations to provide a large range of positions to mount the work basket 10 relative to the host truck and the surface of the highway.

One skilled in the art will recognize that the mounting of the hitch member 29 into a conventional hitch receiver (not shown) typically results is a fairly loose connection of the work basket 10 to the host truck. While fore-and-aft movement of the work basket 10 would be rather limited, the lateral, side-to-side, motion of the work basket could be significant. Lateral movement of the work basket 10 would be associated with the movement of a worker on the work basket, especially to the side of the work basket where the safety gate 14 is located, which would be necessary for a worker to place a highway cone or panel onto the highway surface. Accordingly, lateral stability of the work basket 10 in conjunction with the use of the hitch mounting mechanism 20 would be desired.

Figure 10:
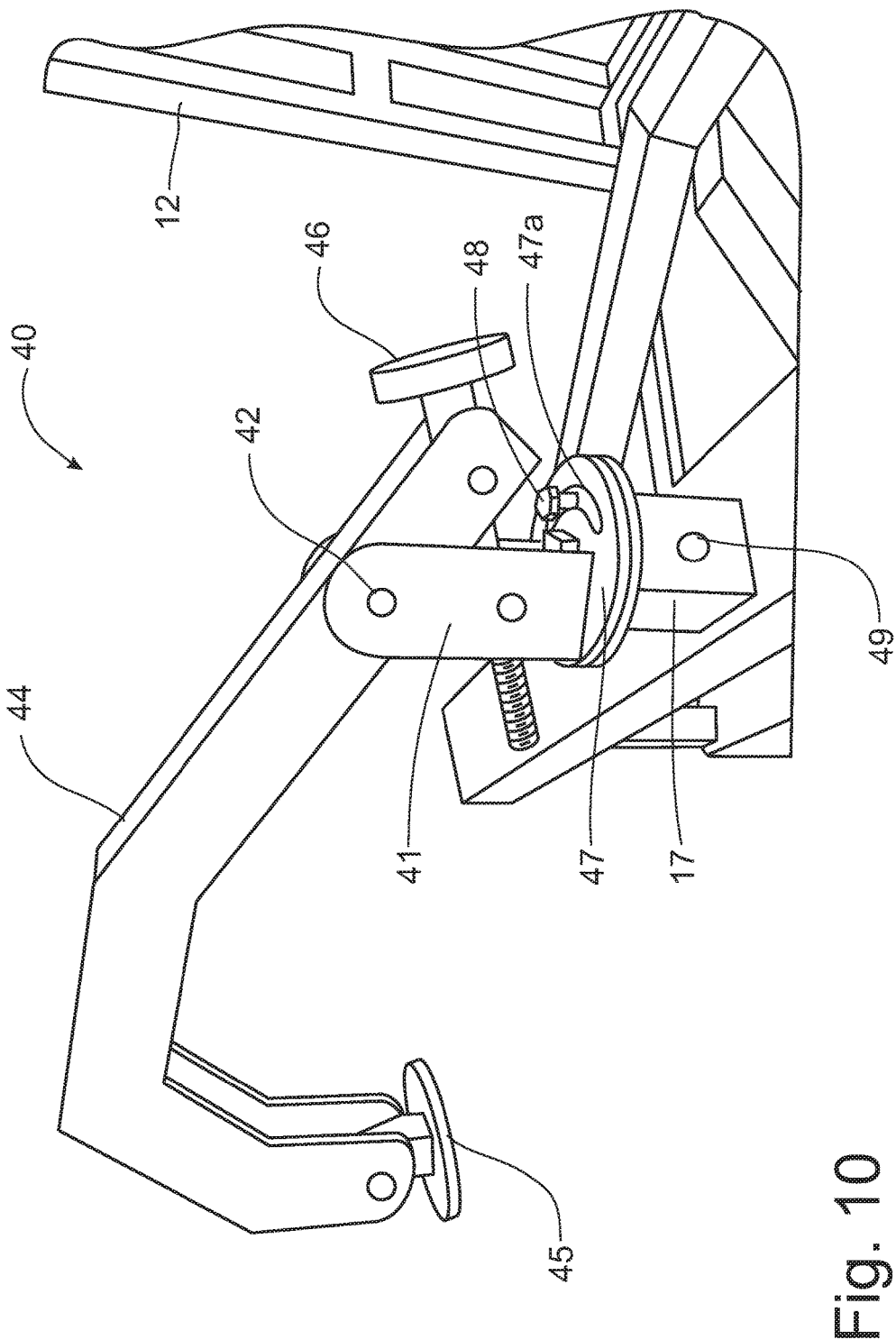
FIG. 10 is a left side perspective view of an outrigger mounted on the frame of the work basket to stabilize the work basket relative to the vehicle to which the work basket is mounted.

To stabilize the lateral movement of the work basket 10, the frame 15 of the work basket 10 is provided with a pair of laterally spaced outriggers 40, as can be seen in FIGS. 10 and 11. One skilled in the art will recognize that only one of the outriggers 40 is shown in FIGS. 10 and 11 to allow the details of the construction of the outriggers 40 to be viewed better. Each outrigger 40 is formed with a vertical support shaft (not shown) that is received into a hollow lateral vertical frame post 17. Either the lateral vertical frame post 17 or, preferably, the vertical shaft (not shown) of the outrigger 40 is formed with a plurality of fastener openings (not shown) to allow a pin or fastener 49 to pass through openings 17a in the lateral vertical frame post 17 and through a selected fastener opening (not shown) in the vertical shaft (not shown) of the outrigger 40 to permit the outrigger 40 to be mounted in at least two selectable heights relative to the lateral vertical frame member.

The outrigger 40 is also formed with a support bracket 41 fixed to the vertical shaft to carry a pivot connection 42 and a horizontal brace 43 having a threaded hole passing therethrough. An arched outrigger arm 44 is connected to the support bracket 41 by the pivot 42 and extends forwardly and outwardly from the lateral vertical frame post 17. At the distal end of the outrigger arm 44 a foot member 45 is pivotally supported for engagement with the top surface of the bumper (not shown) of the host truck. Interconnecting the proximal end of the outrigger arm 44 and the horizontal brace 43 is an adjustment screw 46 which controls the pivoted position of the outrigger arm 44 relative to the support bracket 41, and as a result, the vertical position of the foot member 45. To provide minute vertical positioning of the foot member 45, the adjustment screw 46 is rotated to thread the adjustment screw into or out of the horizontal brace 43, resulting in the raising or lowering of the proximal end of the outrigger arm 44 relative to the support bracket 41.

Figure 4:
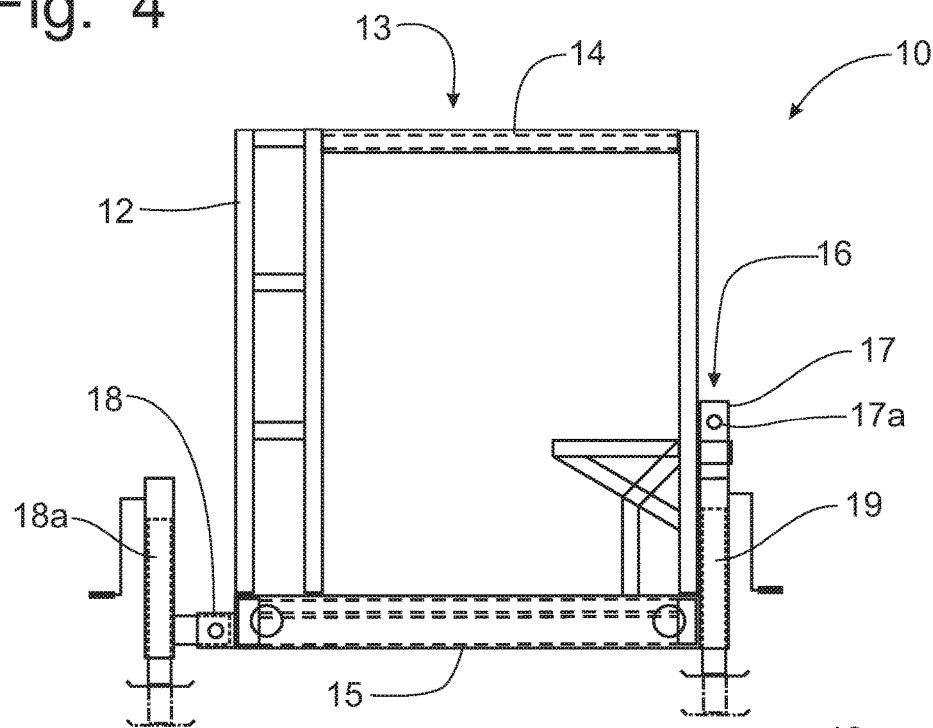
FIG. 4 is a right side elevational view of the frame for the work basket shown in FIG. 1 with optional jack stands added for an elevated support of the work basket during storage.
Figure 6:
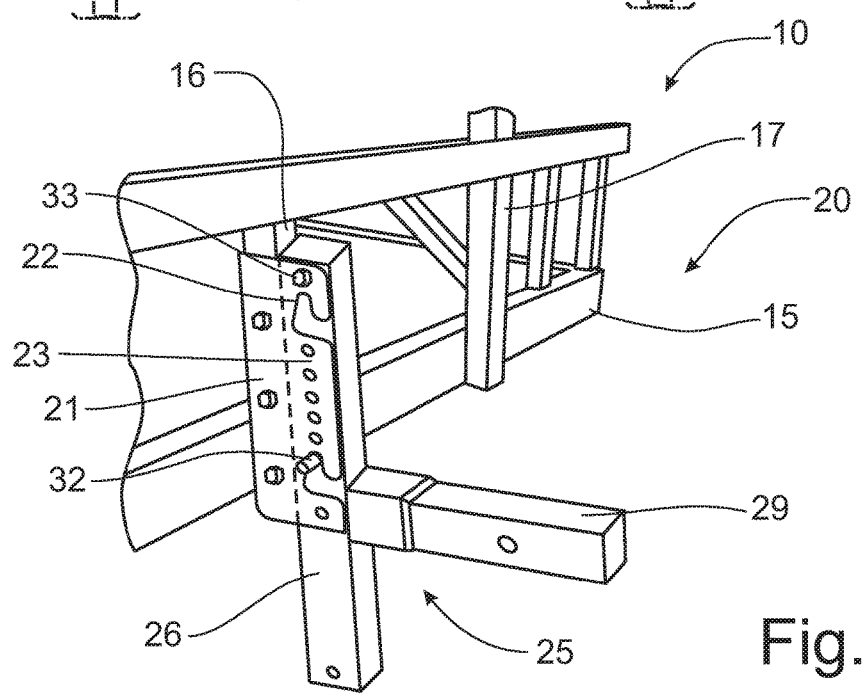
FIG. 6 is a partial right, front perspective view of the mounting mechanism attached to the work basket frame and ready for connection to a hitch receiver of a highway truck.
Figure 5:
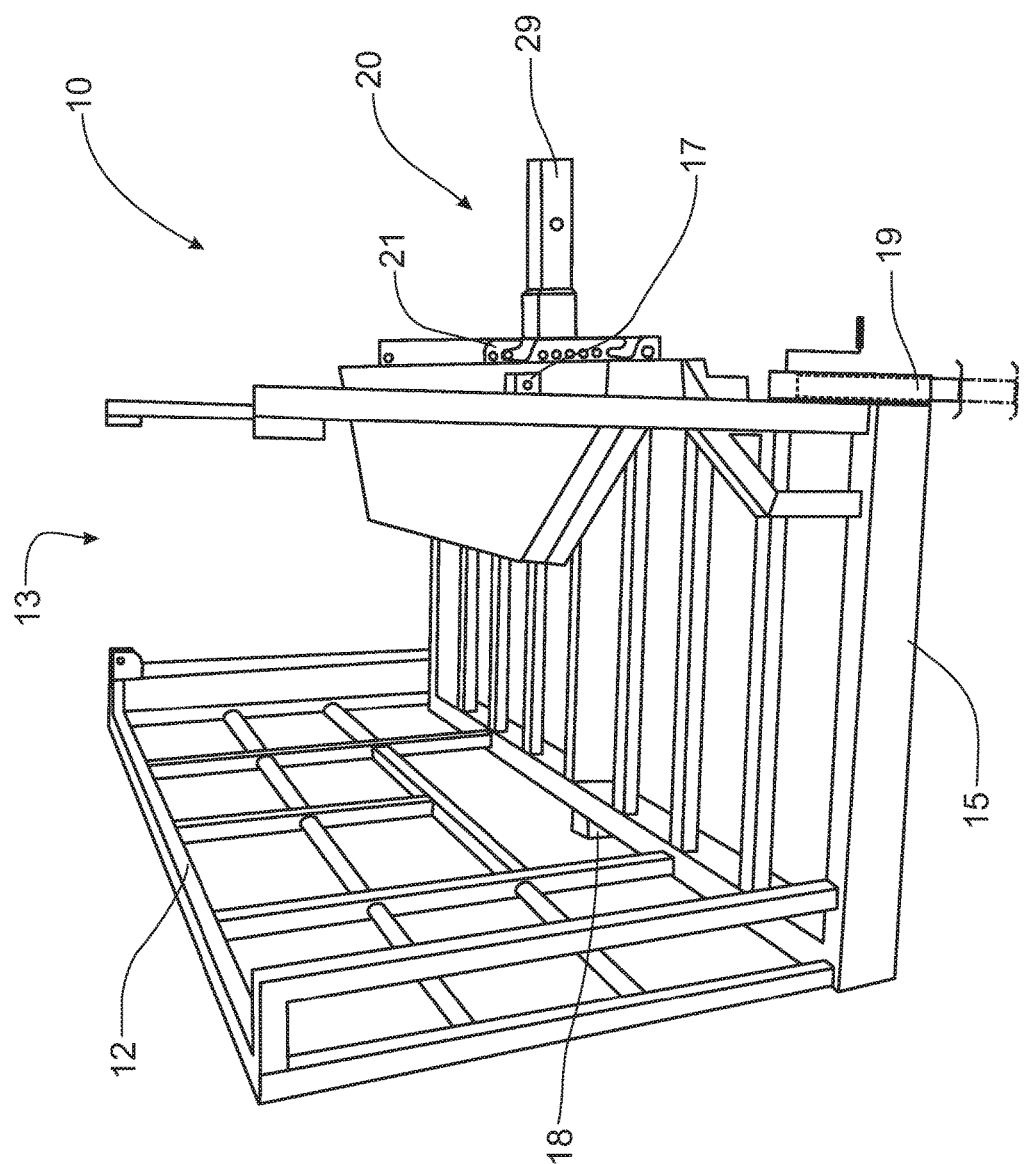
FIG. 5 is a left side perspective view of the frame for the work basket incorporating the principles of the instant invention with the mounting mechanism mounted on frame members at the front of the work basket with optional jack stands added for an elevated support of the work basket during storage.

Referring now to FIGS. 3-5, an optional jack stand mechanism 18a, 19 can be utilized to support the work basket 10 at a position and at an elevation that the work basket 10 can be connected to a host vehicle (not shown) by a single person. The frame 15 would include a jack stand 19 affixed to each of the rearward outboard corners of the frame 15. The jack stand 19 would be telescopic in a conventional manner to support the work basket 10 at the desired height. In addition, a removable jack stand 18a can be secured to the hitch receiver 18 at the center of the front of the frame 15 to support the work basket 10 in conjunction with the two rearward jack stands 19. The removable jack stand 18a would have a horizontal member (not shown) that is received into and pinned to the hitch receiver 18. Then the telescopic jack stand 18a can be manipulated in conjunction with the rearward jack stands 19 to support the work basket 10 in a manner that the host vehicle (not shown) can be positioned for an easy mounting of the work basket 10 thereto.

One skilled in the art will recognize that the gross positioning of the outrigger arm 44 relative to the truck bumper (not shown) is achieved by the selected positioning of the vertical shaft (not shown) of the outrigger 40 within the lateral vertical frame post 17. The top horizontal plate 47 is pivotable relative to the underlying plate to enable the outrigger arm 44 to move in a horizontal direction, allowing the foot member 45 to be properly positioned above a flat surface on the host vehicle, such as the rear bumper. The clamp bolt 48, which passes through an arcuate opening 47*a* in the top horizontal plate 47 to allow the pivotal movement of the top horizontal plate 47, can then be tightened to prevent further horizontal movement of the foot member 45. Then, with the foot member 45 located slightly above the top surface of the truck bumper (not shown), the adjustment screw 46 can be manipulated to press the foot member 45 into firm engagement with the top surface of the truck bumper or other flat surface of the host vehicle. With an outrigger 40 placed at opposing ends of the work basket 10 into engagement with the opposing lateral ends of the truck bumper, the lateral stability of the work basket 10 is secured. A repositioning of the weight of the worker(s) to one side of the work basket 10 will be resisted by the foot member 45 engaged with the top surface of the truck bumper and keep the work basket 10 from flexing laterally.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A work basket mountable on the rearward end of a host vehicle for deploying and retrieving highway markers from a highway surface, comprising:
    a frame including horizontal members for supporting a platform floor and vertical frame members including a central vertical frame member and a pair of opposing lateral vertical frame members;
    a hitch mechanism affixed to said frame for mounting said frame to a hitch receiver on the host vehicle; and
    a pair of outriggers supported, respectively, in the lateral vertical frame members, each said outrigger being adjustably positionable both vertically and horizontally to permit movement of each respective said outrigger for the selective engagement of a flat surface on the host vehicle to provide lateral stability for said frame, each said outrigger including
        a support shaft adapted to be received within the corresponding said lateral vertical frame member;
        a support bracket affixed to said support shaft and positioned to be oriented on top of said lateral vertical frame member; and
        an arched arm pivotally connected to said support bracket, said arm having a proximal end and a distal end with said proximal end being pivotally connected to said support bracket and said distal end including an engagement head.

2. The work basket of claim 1 wherein each of said outriggers includes an outrigger arm pivotally supported by a vertical shaft received within the corresponding lateral vertical frame member.

3. The work basket of claim 2 wherein each said outrigger further includes an adjustment screw interconnecting the outrigger arm and a support bracket carried on said vertical shaft to control pivotal movement of said outrigger arm relative to said support bracket.

4. The work basket of claim 3 wherein said outrigger is horizontally pivotable relative to said frame to allow for horizontal positioning of said outrigger arm relative to said frame.

5. The work basket of claim 4 wherein each outrigger arm includes a foot member engagable with the flat surface of the host vehicle.

6. The work basket of claim 5 wherein the flat surface on the host vehicle is a top surface of a rear bumper of said host vehicle.

7. The work basket of claim 1 wherein said hitch mechanism is vertically adjustable to accommodate different heights of the hitch receiver on the host vehicle.

8. The work basket of claim 7 wherein said hitch mechanism comprises:
    a support bracket affixed to said frame, said support bracket including fastener openings and hook members; and
    a hitch member formed with at least two vertically spaced holes alignable with said fastener openings in said support bracket to receive a fastener therethrough, said hitch member bearing a pin projecting from the sides of the hitch member to engage a corresponding pair of said hook members on said support bracket, said hitch member being engagable with the hitch receiver on said host vehicle.

9. A work basket for mounting on the rearward end of a host vehicle having a hitch receiver, comprising:
    a frame including horizontal members for supporting a platform floor and vertical frame members including a central vertical frame member and a pair of opposing lateral vertical frame members;
    a hitch mechanism for mounting said frame to said hitch receiver on the host vehicle; and
    a pair of outriggers supported, respectively, in the lateral vertical frame members, each said outrigger being adjustably positionable to engage a top surface of a rear bumper of the host vehicle to provide lateral stability for said frame, each said outrigger including:
        a support shaft adapted to be received within the corresponding said lateral vertical frame member;
        a support bracket affixed to said support shaft and positioned to be oriented on top of said lateral vertical frame member; and
        an arched arm pivotally connected to said support bracket, said arm having a proximal end and a distal end with said proximal end being pivotally connected to said support bracket and said distal end including an engagement head.

10. The work basket of claim 9 wherein each said outrigger further comprises:
    an adjustment mechanism interconnecting said support bracket and said arm to control the pivotal movement of said arm to position selectively said engagement head relative to said frame.

11. The work basket of claim 10 wherein said adjustment mechanism is a threaded rod received within a treaded opening in a horizontal brace in said support bracket, said threaded rod being mounted on said arm such the rotation of said threaded rod to move relative to said horizontal brace causes said arm to pivot on said support bracket.

12. The work basket of claim 9 wherein said support shaft is vertically positionable within said lateral vertical frame member to orient said engagement head into a selected initial position before manipulation of said arm.

13. The work basket of claim 12 wherein said support shaft is formed with a plurality of horizontal openings spaced vertically to be selectively engaged with a pin inserted through said lateral vertical frame member to locate said support shaft in a selected vertical position relative to said lateral vertical frame member.

14. The work basket of claim 12 wherein said arm is pivotally moveable about a vertical axis within said vertical frame member to allow positioning of said engagement head in said selected initial position.

15. A work basket mountable on the rearward end of a host vehicle having a hitch receiver, said work basket being operable to permit highway markers to be deployed or retrieved from a highway surface, comprising:
   a frame including horizontal members for supporting a platform floor and vertical frame members including a central vertical frame member and a pair of lateral vertical frame members on opposing sides of said central vertical frame member;
   an adjustable hitch mechanism affixed to said frame for detachably mounting said frame to the hitch receiver on the host vehicle, said hitch mechanism including a support bracket affixed to said frame, said support bracket including fastener openings and hook members, and a hitch member formed with at least two vertically spaced holes alignable with said fastener openings in said support bracket to receive a fastener therethrough, said hitch member bearing a pin projecting from the sides of the hitch member to engage a corresponding pair of said hook members on said support bracket, said hitch member being engagable with the hitch receiver on said host vehicle; and
   a pair of outriggers supported, respectively, in the lateral vertical frame members, each said outrigger being adjustably positionable both vertically and horizontally to engage a flat surface on the host vehicle and provide lateral stability for said frame, each said outrigger having a support shaft adapted to be received within the corresponding said lateral vertical frame member, a support bracket affixed to said support shaft and positioned to be oriented on top of said lateral vertical frame member, and an arched outrigger arm pivotally connected to said support bracket, said outrigger arm having a proximal end and a distal end with said proximal end being pivotally connected to said support bracket and said distal end including a foot member to engage the flat surface on the host vehicle.

16. The work basket of claim 15 wherein each said outrigger further comprises an adjustment mechanism including a threaded rod received within a treaded opening in a horizontal brace in said support bracket, said threaded rod being mounted on said outrigger arm such the rotation of said threaded rod to move said threaded rod relative to said horizontal brace causes said outrigger arm to pivot on said support bracket.

17. The work basket of claim 16 wherein said support shaft is vertically positionable within said lateral vertical frame member to orient said foot member into a selected initial position before manipulation of said outrigger arm, said support shaft being formed with a plurality of horizontal openings spaced vertically to be selectively engaged with a pin inserted through said lateral vertical frame member to locate said support shaft in a selected vertical position relative to said lateral vertical frame member.

18. The work basket of claim 17 wherein said outrigger arm is pivotally moveable about a vertical axis within said vertical frame member to allow positioning of said foot member in said selected initial position.

19. The work basket of claim 18 wherein said support bracket is mounted on a pivot plate formed with an arcuate slot for the passage of a clamping bolt, said pivot plate being rotatable above a base plate affixed to support shaft, the rotation of said pivot plate through the range of motion permitted by said arcuate slot relative to said base plate affecting horizontal movement of said outrigger arm about said vertical axis.

* * * * *